United States Patent [19]
Yamashita et al.

[11] Patent Number: 5,230,002
[45] Date of Patent: Jul. 20, 1993

[54] COMPACT DEVICE FOR MONITORING ATM CELLS

[75] Inventors: Hiroshi Yamashita; Takashi Miyazono, both of Tokyo, Japan

[73] Assignee: NEC Corporation, Japan

[21] Appl. No.: 821,691

[22] Filed: Jan. 16, 1992

[30] Foreign Application Priority Data

Jan. 16, 1991 [JP] Japan .................................. 3-014963
Jan. 30, 1991 [JP] Japan .................................. 3-029384
Jan. 31, 1991 [JP] Japan .................................. 3-054173

[51] Int. Cl.⁵ .............................................. G06F 11/00
[52] U.S. Cl. .................................. 371/37.1; 371/37.7
[58] Field of Search ................ 371/37.1, 37.6, 37.7, 371/38.1, 39.1, 42

[56] References Cited
U.S. PATENT DOCUMENTS 4,397,020  8/1983  Howson ............................. 371/37.1
4,700,350 10/1987  Douglas et al. ................... 371/37.1

*Primary Examiner*—Vincent P. Canney
*Attorney, Agent, or Firm*—Ostrolenk, Faber, Gerb & Soffen

[57] ABSTRACT

In a device for checking a header error in a header part of an STM signal (S) which part comprises first through P-th header blocks and an HEC (header error check) block, each header block comprising first through N-th ATM cell header units, the HEC block comprising first through N-th ATM cell HEC units, a sole error checking section (33, 35, 37) checks the header error in connection with an n-th ATM cell header unit of a p-th header block and an n-th ATM cell HEC unit when a collective control signal indicates the n-th ATM cell header unit of the p-th header block and the n-th ATM cell HEC unit, where n is variable between 1 and N, both inclusive, p being variable between 1 and P, both inclusive. A signal producing section (15) produces the collective control signal for indicating successively the first through the N-th ATM cell header units of the first through the P-th header blocks and subsequently successively the first through the N-th ATM cell HEC units. On monitoring an ATM cell of a preselected number of bytes, the ATM cell may be converted into a converted cell of the preselected number of bytes plus an empty byte at first. Subsequently, an error correcting code is calculated from the preselected number of bytes of the converted cell and is placed in the empty byte to form a full cell.

9 Claims, 10 Drawing Sheets

COMPACT DEVICE FOR MONITORING ATM CELLS

BACKGROUND OF THE INVENTION

This invention relates to a device for monitoring ATM (asynchronous transfer mode) cells used in an STM (synchronous transfer mode) signal and to a header error check (HEC) device for checking a header error in the ATM cells.

The ATM cells are transmitted in a synchronous transfer mode as the STM signal. The synchronous transfer mode is used on various levels. When transmitted in the synchronous transfer mode of a level M, where M represents a prescribed natural number, the STM signal is called an STM-M signal. An STM-1 signal is transmitted at a bit rate of 155.52 Mbits/s and comprises 2,016 telephone channels. An STM-4 signal is transmitted at a higher bit rate of 622.08 Mbits/s and comprises 8,064 telephone channels. An STM-16 signal is transmitted at a still higher bit rate of 2,488.32 Mbits/s and comprises 32,256 telephone channels.

In the manner which will later be described more in detail, various header error check devices are already known. Such a header error check device has a data input terminal for receiving the STM signal comprising a header part. The header error check device is for checking a header error in the header part. The header part comprises first through P-th header blocks and a header error check block, where P represents a first predetermined natural number. Each of the header blocks comprises first through N-th ATM cell header units, where N represents a second predetermined natural number. The header error check block comprises first through N-th ATM cell header error check units. The first ATM cell header units of the first through the P-th header blocks and the first ATM cell header error check unit constitute a header of a first ATM cell. Likewise, the N-th ATM cell header units of the first through the P-th header blocks and the N-th ATM cell header error check unit constitute a header of an N-th ATM cell. Each of the first through the N-th ATM cell header units and the first through the N-th ATM cell header error check units comprises a third predetermined natural number of bits at a predetermined bit interval.

The header error check device includes a control signal producing section, such as an SDH (synchronous digital hierarchy) terminator or terminating circuit, connected to the data input terminal for producing a collective control signal. In conventional header error check devices, the collective control signal comprises first through N-th control signals. An n-th control signal is for indicating successively the bits of an n-th ATM cell header unit in each of the header blocks and the bits of an n-th header error check unit, where n is variable between 1 and N, both inclusive.

In one of the conventional header check devices, an n-th serial-parallel converter is controlled by the n-th control signal to convert each of the n-th ATM cell header units in first through the P-th header blocks and of the n-th header error check unit to an n-th bit-parallel signal. An n-th cyclic redundancy check circuit carries out cyclic redundancy check on the n-th bit-parallel signal to check the header error in the n-th ATM cell header units of the header blocks.

In another of the conventional header check devices, an n-th cyclic redundancy check circuit is controlled by the n-th control signal to carry out cyclic redundancy check on each n-th ATM cell header unit of the STM signal. The n-th cyclic redundancy check circuit thereby checks the header error in the n-th ATM cell header units of the header blocks.

It is now understood that such a conventional header error check device comprises first through N-th cyclic redundancy check circuits. As a consequence, the conventional header error check devices are bulky and expensive.

Inasmuch as the conventional header error check device can check the header error in the headers of the first through the N-th ATM cells by checking the header error in the header part of the STM signal by the use of the first through the N-th ATM header error check units, it is understood that the header error check device is a device for monitoring the ATM cells. However, the conventional header error check device can not check an information error in an information field of the ATM cell that constitutes the ATM cell together with the header of the ATM cell.

SUMMARY OF THE INVENTION

It is therefore an object of this invention to provide a header error check device which is compact.

It is another object of this invention to provide a header error check device of the type described, which device is inexpensive.

It is a specific object of this invention to provide an ATM cell monitoring device which can check not only a header error in a header of an ATM cell but also an information error in an information field of the ATM cell.

Other objects of this invention will become clear as the description proceeds.

On setting forth the gist of an aspect of this invention, it is possible to understand that a header error check device has a data input terminal for receiving an STM signal comprising a header part. The header error check device is for checking a header error in the header part. The header part comprises first through P-th header blocks and a header error check block, where P represents a first predetermined natural number. Each of the header blocks comprises first through N-th ATM cell header units, where N represents a second predetermined natural number. The header error check block comprises first through N-th ATM cell header error check units. The header error check device includes a control signal producing section connected to the data input terminal for producing a collective control signal for indicating successively the first through the N-th ATM cell header units of the first through the P-th header blocks and subsequently successively the first through the N-th ATM cell header error check units.

According to the aspect of this invention, the above-understood header error check device comprises: a sole error checking section connected to the data input terminal and to the control signal producing section for checking the header error in connection with an n-th ATM cell header unit of a p-th header block and an n-th ATM cell header error check unit, where n is variable between 1 and N, both inclusive, p being variable between 1 and P, both inclusive, when the collective control signal indicates the n-th ATM cell header unit of the p-th header block and the n-th ATM cell header error check unit.

On setting forth the gist of another aspect of this invention, it is possible to understand that an ATM cell monitoring device is for use in combination with an ATM cell transmission system having system input and system output terminals. The system input terminal is for receiving a system input ATM cell. The ATM cell transmission system is for transmitting the system input ATM cell to the system output terminal to produce the system input ATM cell as a system output ATM cell. The ATM cell monitoring device is for monitoring the ATM cell transmission system to check an error in the system output ATM cell.

According to this aspect of this invention, the above-understood ATM cell monitoring device comprises: a first format converter supplied with an original ATM cell of a preselected number of bytes for converting the original ATM cell into a first converted ATM cell of the preselected number of bytes plus an empty byte; a first error checking circuit connected to the format converter for checking a first error in the preselected number of bytes in the first converted ATM cell to produce a first error correcting code; a combiner connected to the system input terminal of the ATM cell transmission system, the format converter, and the first error checking circuit for producing a full ATM cell by placing the first error correcting code in the empty byte of the first converted ATM cell, the combiner delivering the full ATM cell to the system input terminal as the system input ATM cell; a second error checking circuit connected to the system output terminal of the ATM cell transmission system for checking a second error in the preselected number of bytes in the system output ATM cell to produce a second error correcting code; and a comparator connected to the system output terminal of the ATM cell transmission system and the second error checking circuit for carrying out a comparing operation of comparing the first error correcting code of the system output ATM cell with the second error correcting code to produce a result of the comparing operation.

DESCRIPTION OF THE PREFERRED EMBODIMENTS

Figure 1:
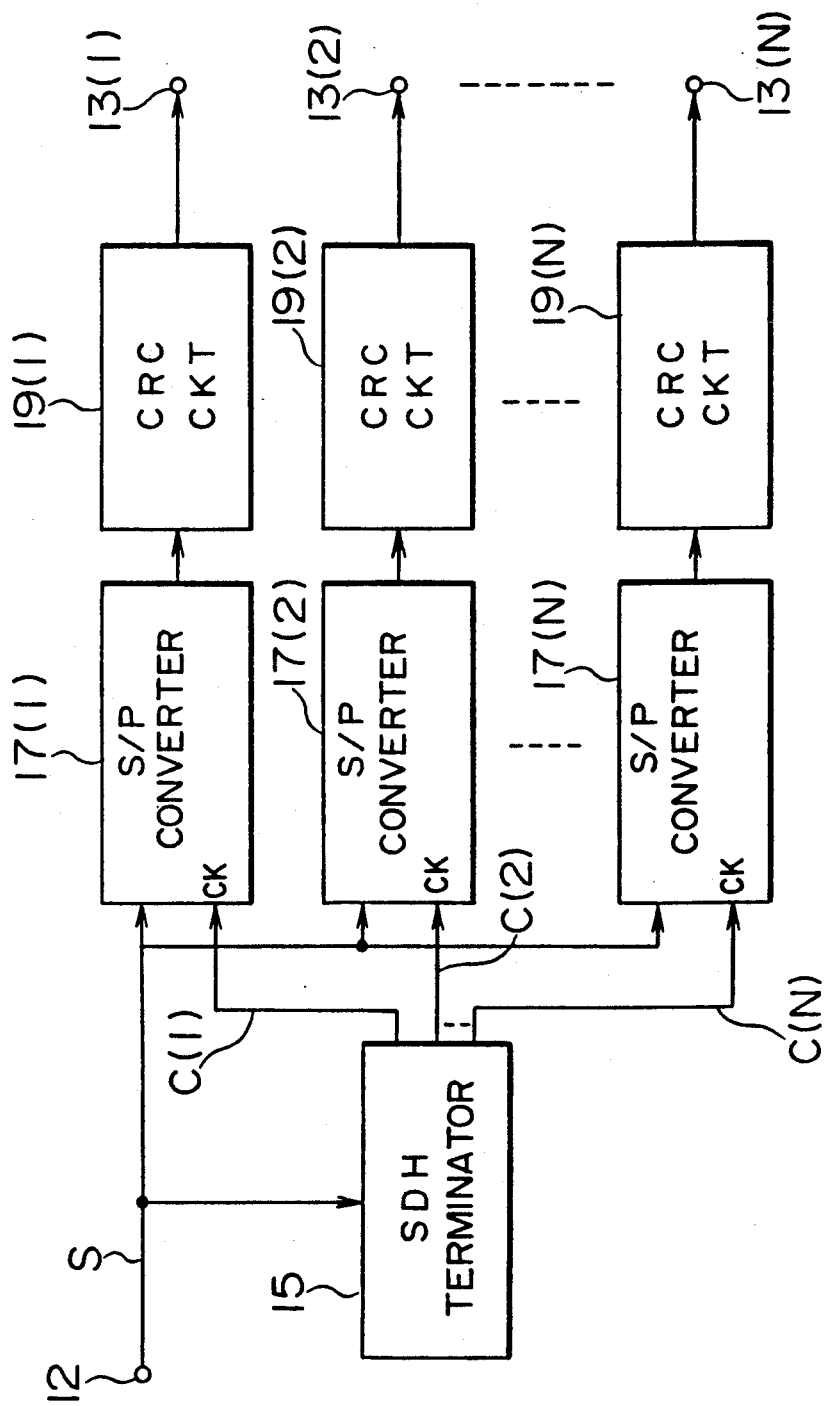
FIG. 1 is a block diagram of a conventional header error check device.

Referring to FIG. 1, a conventional header error check (HEC) device will first be described for a better understanding of this invention. The header error check device has a data input terminal 12 for receiving an STM (synchronous transfer mode) signal S of a level M, where M represents a prescribed natural number. Examples of the level M are described heretobefore.

The header error check device further has first through N-th result output terminals 13(1), 13(2), ..., and 13(N). When taken into consideration altogether, the result output terminals will be designated by the reference numeral 13 with suffixes omitted. When attention is directed to a particular one of the result output terminals 13, that result output terminal will be called an n-th result output terminal and designated by 13(n), where n is variable between 1 and N, both inclusive. This applies to other reference numerals and symbols which are used throughout the instant specification.

Figure 2:
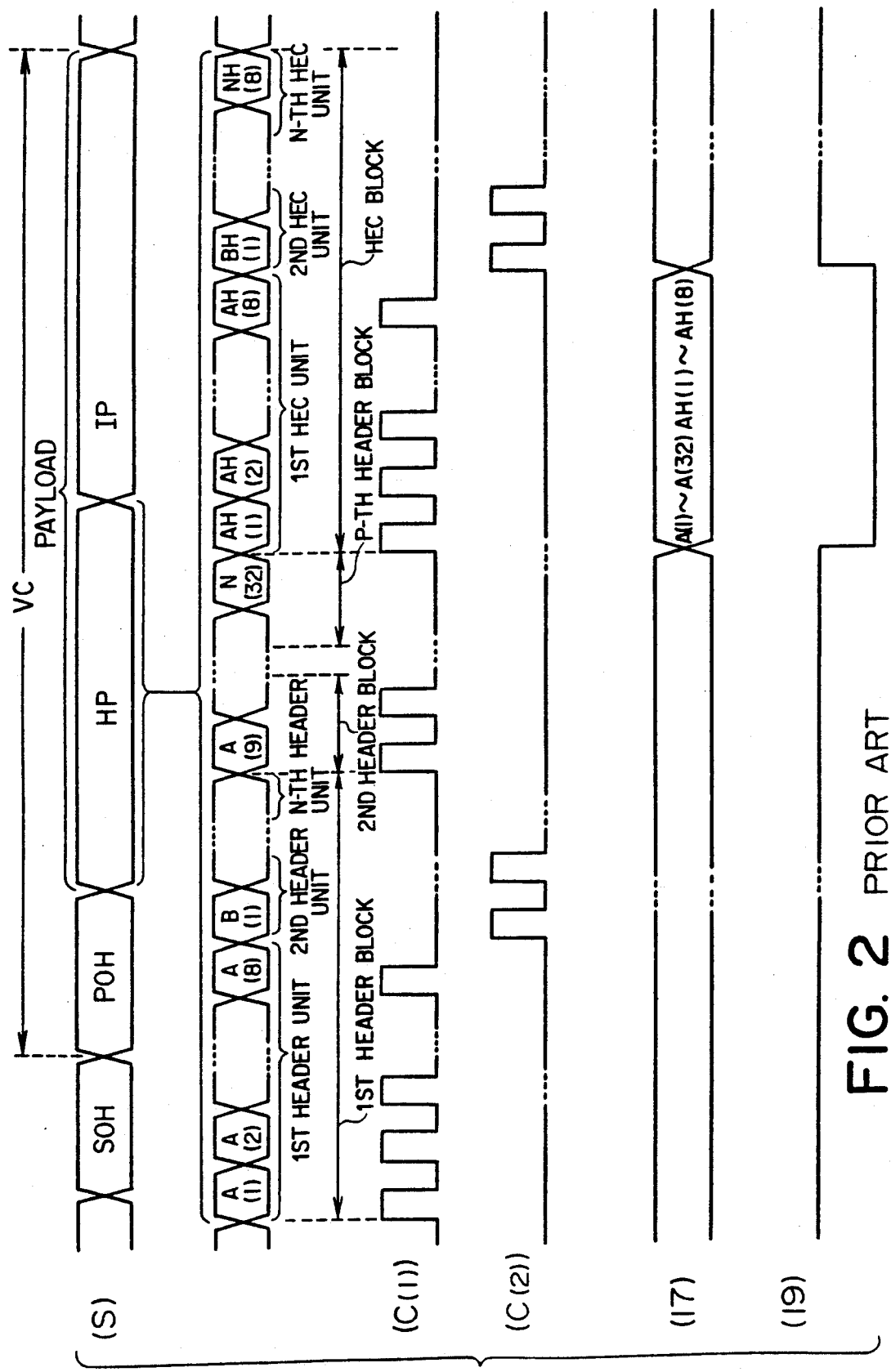
FIG. 2 is a time chart for use in describing operation of the device illustrated in FIG. 1.

Turning to FIG. 2, the STM signal S comprises a section overhead SOH and a virtual container VC as depicted along a first line labelled (S). The section overhead SOH is known in the art. The virtual container VC comprises a path overhead POH and a payload which comprises a header part HP and an information part IP. The path overhead POH follows the section overhead SOH in the STM signal S and is also known in the art. The header part HP follows the path overhead POH in the STM signal S and is followed by the information part IP which comprises first through J-th information blocks (not herein shown), where J represents a prescribed positive integer. Each of the information blocks comprises first through N-th ATM information units (not shown). The header error check device of FIG. 1 is for checking a header error in the header part HP.

As depicted along a second line in FIG. 2 in detail, the header part HP comprises first through P-th header blocks and a header error check (HEC) block, where p represents a first predetermined natural number. Each of the header blocks comprises first through N-th ATM (asynchronous transfer mode) cell header units, where N represents a second predetermined natural number. The first through the N-th ATM cell header units are indicated at "first through N-th header units" with names thereof compressed. The header error check block comprises first through N-th ATM cell header error check units which are indicated at "first through N-th HEC units" with names thereof abbreviated. Each of the first through the N-th ATM cell header units and the first through the N-th ATM cell header error check units comprises a third predetermined natural number Q of bits at a predetermined bit interval.

It will be assumed that the first predetermined natural number P is equal to four and that the second predetermined natural number N has not a specific value for the time being. In general, the third predetermined natural number Q is typically equal to eight. That is, each of the ATM cell header units and the ATM cell header error check units has a unit length (a header unit or header error check unit length) of one byte or eight bits.

More specifically, the bits of the first ATM cell header unit in the first header block are illustrated at A(1), A(2), ..., and A(8). In the second header block, the bits of the first ATM cell header unit are indicated by A(9), ..., and A(16). In this manner, the first ATM cell header units of the third through the fourth header blocks have the bits represented by A(17) and so forth. Similarly, the bits of the second ATM cell header units of the first header block are represented by B(1), . . . , and B(8).

Supposing that the second predetermined natural number N is equal to four, the bits of the N-th ATM cell header unit of the P-th header block are indicated by N(25), . . . , and N(32). The bits of the first ATM cell header error check unit are depicted at AH(1), AH(2), . . . , and AH(8). The bits of the second ATM cell header error check unit are indicated at BH(1), . . . , and BH(8). The bits of the N-th ATM cell header error check unit end at NH(8).

Figure 3:
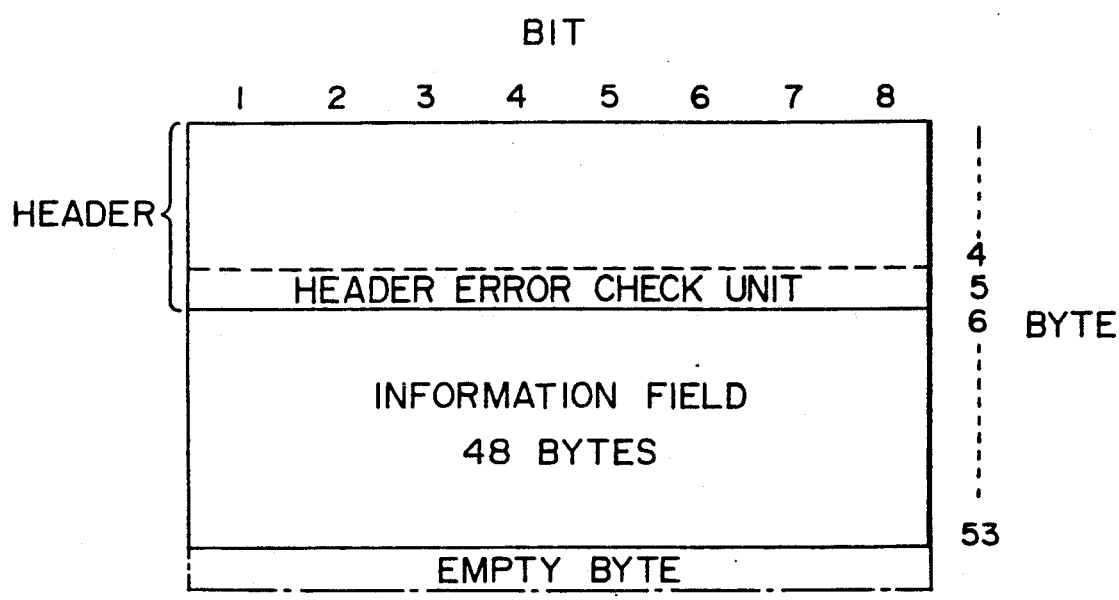
FIG. 3 is a diagram for use in describing a structure of an ATM cell in general.

Further turning to FIG. 3, one of first through N-th ATM cells comprises first through fifty-third bytes or octets in the manner indicated along the ordinate. As illustrated along the abscissa, each byte consists of first through eighth bits which are more in general first through Q-th bits. The illustrated ATM cell will be called an n-th ATM cell, where n is variable between 1 and N, both inclusive as described above.

The first through the fifth bytes are collectively called a header of the n-th ATM cell and the sixth through the fifty-third bytes, an information field of the n-th ATM cell. In the illustrated information field, the prescribed positive integer J is equal to forty-eight.

FIG. 2 will additionally be referred to. The first through the fourth bytes are representative of n-th ATM cell header units in first through fourth header blocks or more in general, the first through the P-th header blocks. In other words, an n-th ATM cell header unit is depicted as a p-th byte, where p is variable between 1 and P, both inclusive. More particularly, a p-th header block consists of the first through the N-th ATM cell header units at the p-th bytes of the first through the N-th ATM cells. In the example being illustrated, the fifth byte is the n-th ATM cell header error check unit. It is now understood that the header part HP comprises the headers of the first through the N-th ATM cells.

In FIG. 2, attention will be directed to n-th ATM cell header units of the first through the P-th header blocks. It is possible to refer to such ATM cell header units as (1, n)-th, (2, n)-th, . . . , and (P, n)-th ATM cell header units. In a p-th block of the first through the P-th header blocks, the n-th ATM cell header unit is called a (p, n)-th ATM cell header unit.

Turning back to FIG. 1 with reference to FIG. 2 continued, the header error check device comprises an SDH (synchronous digital hierarchy) terminator or terminating circuit 15 connected to the data input terminal 12. In response to the section overhead SOH and the path overhead POH, the SDH terminator 15 produces first through N-th bit and unit control signals C(1), C(2), . . . , and C(N). In the manner illustrated in FIG. 2 along third and fourth lines labelled C(1) and C(2) in connection with only the first and the second bit and unit control signals, an n-th bit and unit control signal C(n) indicates the bits of the n-th ATM cell header units in the first through the P-th header blocks and the bits of an n-th ATM cell header error check unit.

First through N-th serial-parallel (S/P) converters 17(1), 17(2), . . . , and 17(N) are connected to the data input terminal 12 and have clock terminals CK supplied with the first through the N-th bit and unit control signals C (suffixes omitted) from the SDH terminator 15. An n-th serial-parallel converter 17(n) of the first through the N-th serial-parallel converters 17 (suffixes omitted) converts the header part HP of the STM signal S to an n-th bit-parallel signal. In the manner depicted in FIG. 2 along a fifth line labelled (17) in connection with the first bit-parallel signal with four assumed as the second predetermined number, the bits A(1) through A(32) of the first ATM cell header units of the first through the P-th or fourth header blocks and the bits AH(1) through AH(8) of the first ATM cell header error check unit appear until the first bit and unit control signal C(1) comes to an end.

First through N-th cyclic redundancy check (CRC) circuits 19(1), 19(2), . . . , and 19(N) are supplied with the first through the N-th bit-parallel signals from the first through the N-th serial-parallel converters 17 (suffixes omitted). Carrying out cyclic redundancy check on the n-th bit-parallel signal, an n-th cyclic redundancy check circuit 19(n) of the first through the N-th cyclic redundancy check circuits 19 (suffixes omitted) produces an n-th check result signal representative of an n-th check result by high and low levels when the header error is and is not found in the n-th ATM cell header units of the first through the P-th header blocks. In the manner illustrated in FIG. 2 along a sixth line labelled (19) in connection with the first check result signal, the n-th check result signal has the low level without loss of generality when no header error is checked in the n-th ATM cell header units of the first through the P-th header blocks. In this manner, the first through the N-th cyclic redundancy check circuits 19 produce the first through the N-th check result signals for delivery to the first through the N-th result output terminals 13.

Figure 4:
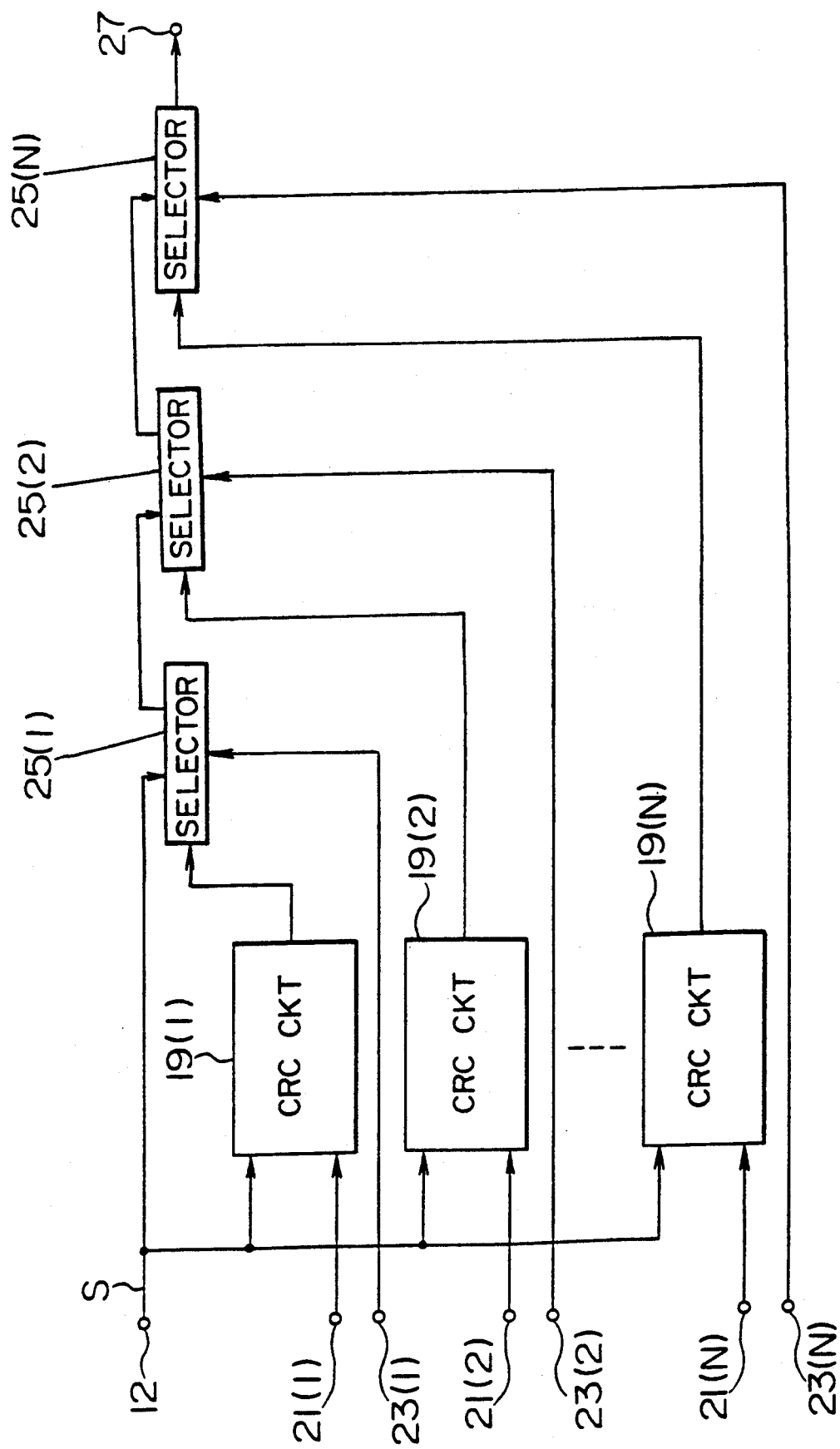
FIG. 4 is a block diagram of another conventional header error check device.
Figure 5:
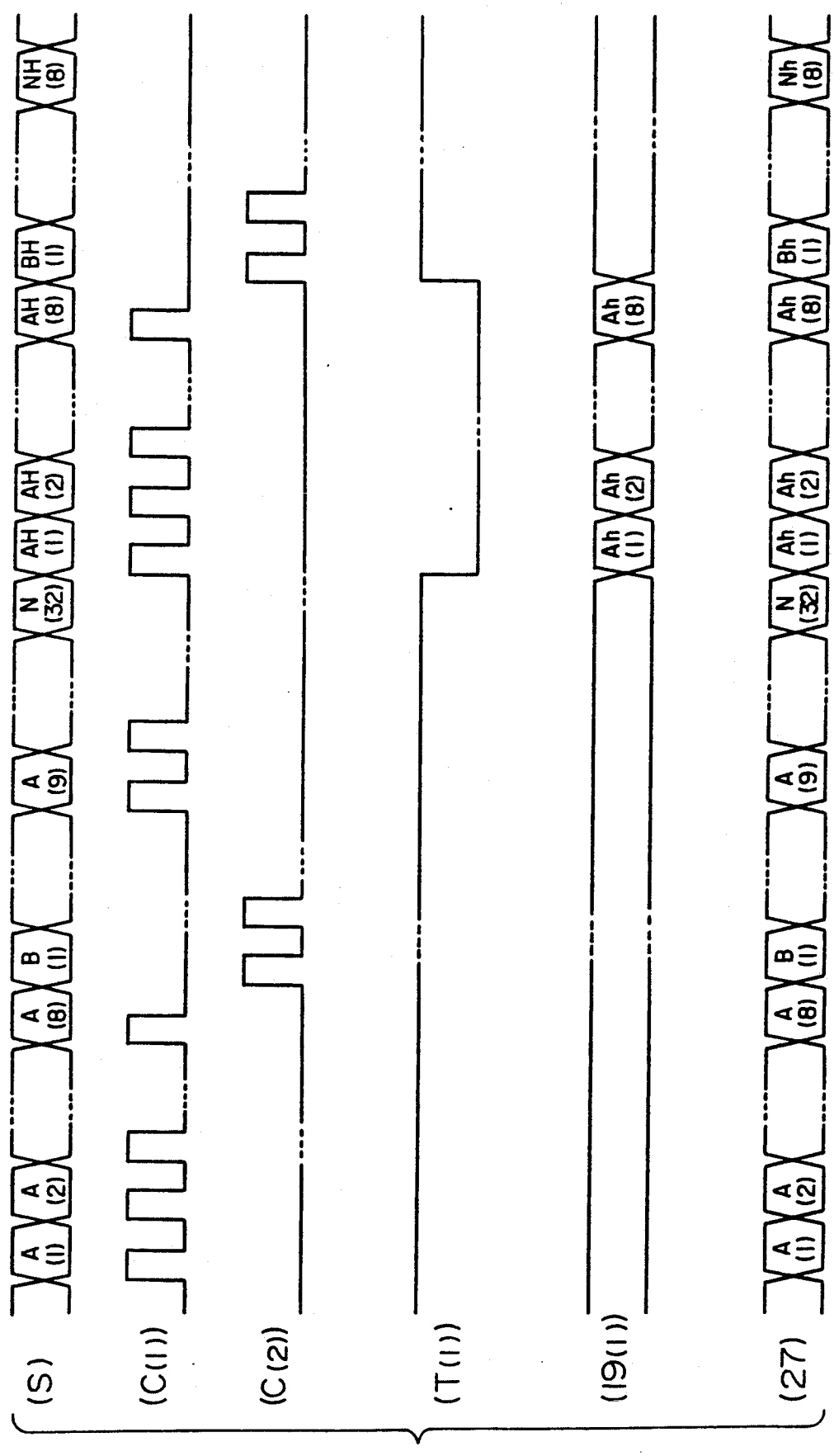
FIG. 5 is a time chart for use in describing operation of the device illustrated in FIG. 4.

Turning to FIGS. 4 and 5, another conventional header error check device will be described. In the header error check device being illustrated, similar parts are designated by like reference numerals.

The data input terminal 12 is supplied with the header part HP of the STM signal S. Although not shown in FIG. 4, the SDH terminator 15 produces the first through the N-th bit and unit control signals C. Furthermore, the SDH terminator 15 selectively produces first through N-th ATM cell header error check unit signals T(1), T(2), . . . , and T(N). Alternatively, the first through the N-th ATM cell header error check unit signals T (suffixes omitted) are called first through N-th selection signals. In correspondence, the first through the N-th bit and unit control signals C will simply be called first through N-th control signals.

The first through the N-th control signals C are supplied to first through N-th control input terminals 21(1), 21(2), . . . , and 21(N) or 21. The first through the N-th selection signals T are delivered to first through N-th selection input terminals 23(1), 23(2), . . . , 23(N) or 23.

In FIG. 5, the header part HP of the STM signal S is illustrated along a first or top row labelled (S). It will be observed that the header part HP is not different from that described in conjunction with FIGS. 1 and 2. In the manner which is depicted along second and third rows labelled (C(1)) and (C(2)) in connection with the first and the second control signals and which is described in connection with FIGS. 1 and 2, the n-th control signal C(n) indicates the bits of the n-th ATM cell header units of the first through the P-th header blocks and the bits of the n-th ATM cell header error check unit. As illustrated along a fourth row labelled (T(1)) in connection with the first selection signal alone, an n-th selection signal T(n) selectively indicates the n-th ATM cell header error check unit.

The first through the N-th cyclic redundancy check (CRC) circuits 19 are connected to the data input terminal 12 directly rather than through the first through the N-th serial-parallel (S/P) converters 17 described in conjunction with FIG. 1. The n-th cyclic redundancy check circuit 19(n) is connected furthermore to an n-th control input terminal 21(n). The n-th control signal C(n) is supplied to the n-th control input terminal 21(n).

Carrying out the cyclic redundancy check on the n-th ATM cell header units of the first through the P-th header blocks which header units are selected by the n-th control signal C(n) from the STM signal S, the n-th cyclic redundancy check circuit 19(n) produces an n-th result signal representative of an n-th result among first through N-th results represented by first through N-th result signals. Although similarly named, the n-th result signal does not have the high or the low level at a time but represents an n-th updated ATM cell header error check unit consisting of a plurality of updated bits, equal in number to the third predetermined natural number. The updated bits of the n-th updated ATM cell header error check unit typically represent, as an error correcting code, a residue given by dividing the n-th ATM cell header units of the first through the P-th header blocks by a generation polynomial.

In the manner exemplified in FIG. 5 along a fifth row labelled (19(1)) in connection with the first result signal, the first updated ATM cell header error check unit consists of updated bits Ah(1), Ah(2), . . . , and Ah(8). In contrast to such updated ATM cell header error check units and such updated bits, the ATM cell header error check units included in the STM signal S received at the data input terminal 12 will now be called original ATM cell header error check units and the bits of each original ATM cell header error check unit will be called original bits.

First through N-th selectors or switches 25(1), 25(2), . . . , and 25(N) are connected in cascade, with the first selector 25(1) connected to the data input terminal 12 and with the N-th selector 25(N) connected to a data output terminal 27. An n-th selector 25(n) is supplied with the n-th result signal from the n-th cyclic redundancy check circuit 19(n). Controlled by the n-th selection signal supplied from an n-th selection input terminal 23(n), the n-th selector 25(n) substitutes the n-th updated ATM cell header error check unit for the n-th original ATM cell header error check unit in the STM signal S which is supplied from the data input terminal 12 through preceding at least one, if any, of the first through the N-th selectors 25 (suffixes omitted) with each original ATM cell header error check unit changed to an updated ATM cell header error check unit. The N-th selector 25(N) therefore supplies the data output terminal 27 with a rebuilt STM signal as a data output signal in which the header error check block is rebuilt into an updated header error check block in the manner depicted in FIG. 5 along a sixth or bottom row labelled (27).

Reviewing FIGS. 1, 2, 4, and 5, the conventional header error check device comprises a great number of cyclic redundancy check circuits 19 when the second predetermined natural number N is great. The second predetermined natural number N represents a multiplicity of the STM signal S. In FIG. 1, the conventional header error check device moreover comprises a great number of serial-parallel converters 17. In FIG. 4, wherein an original synchronous transfer mode signal S is rebuilt into a rebuilt synchronous transfer mode signal, the conventional device additionally comprises a great number of selectors 25. As a consequence, the conventional devices are bulky and expensive.

Figure 6:
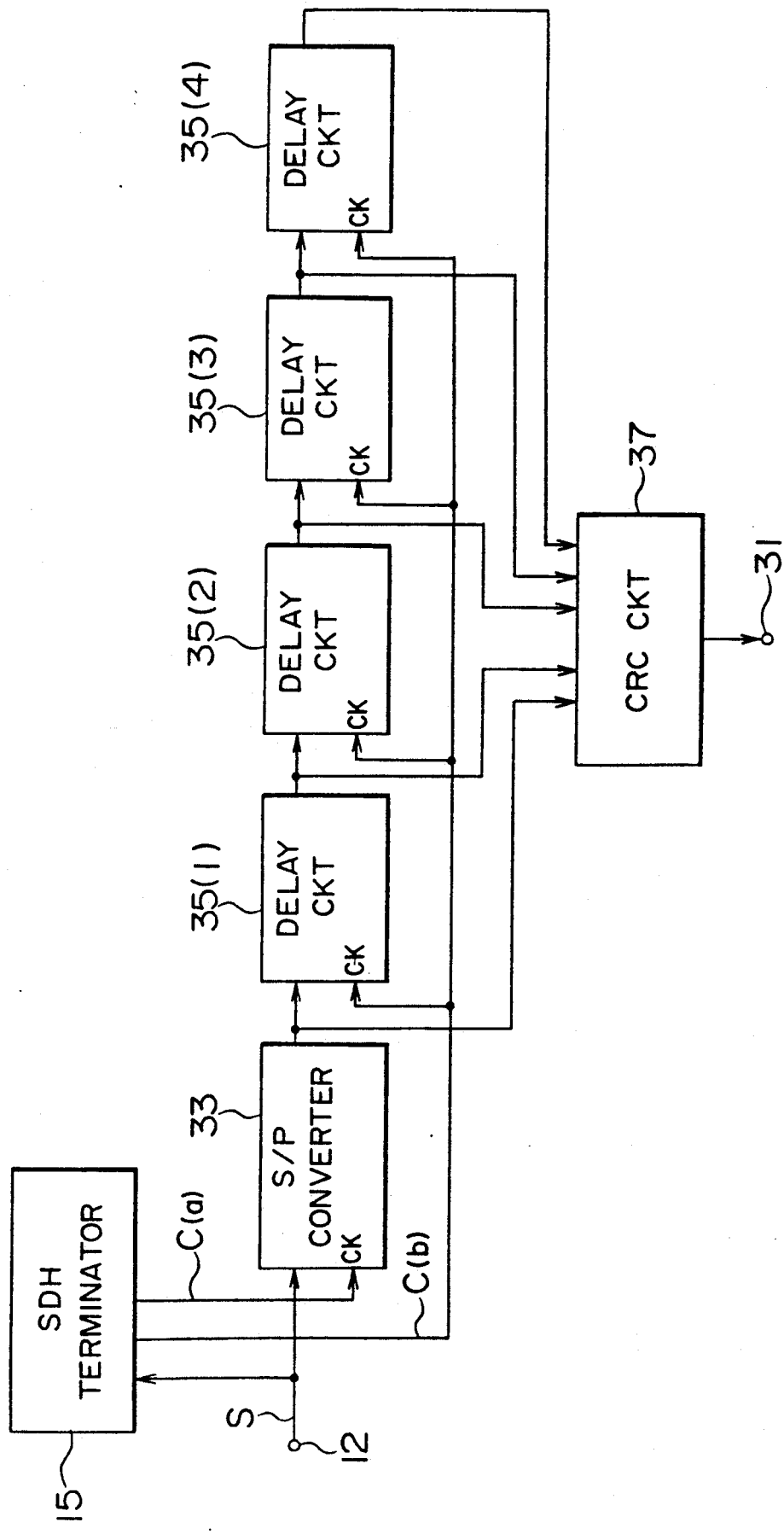
FIG. 6 is a block diagram of a header error check device according to a first embodiment of this invention.
Figure 7:
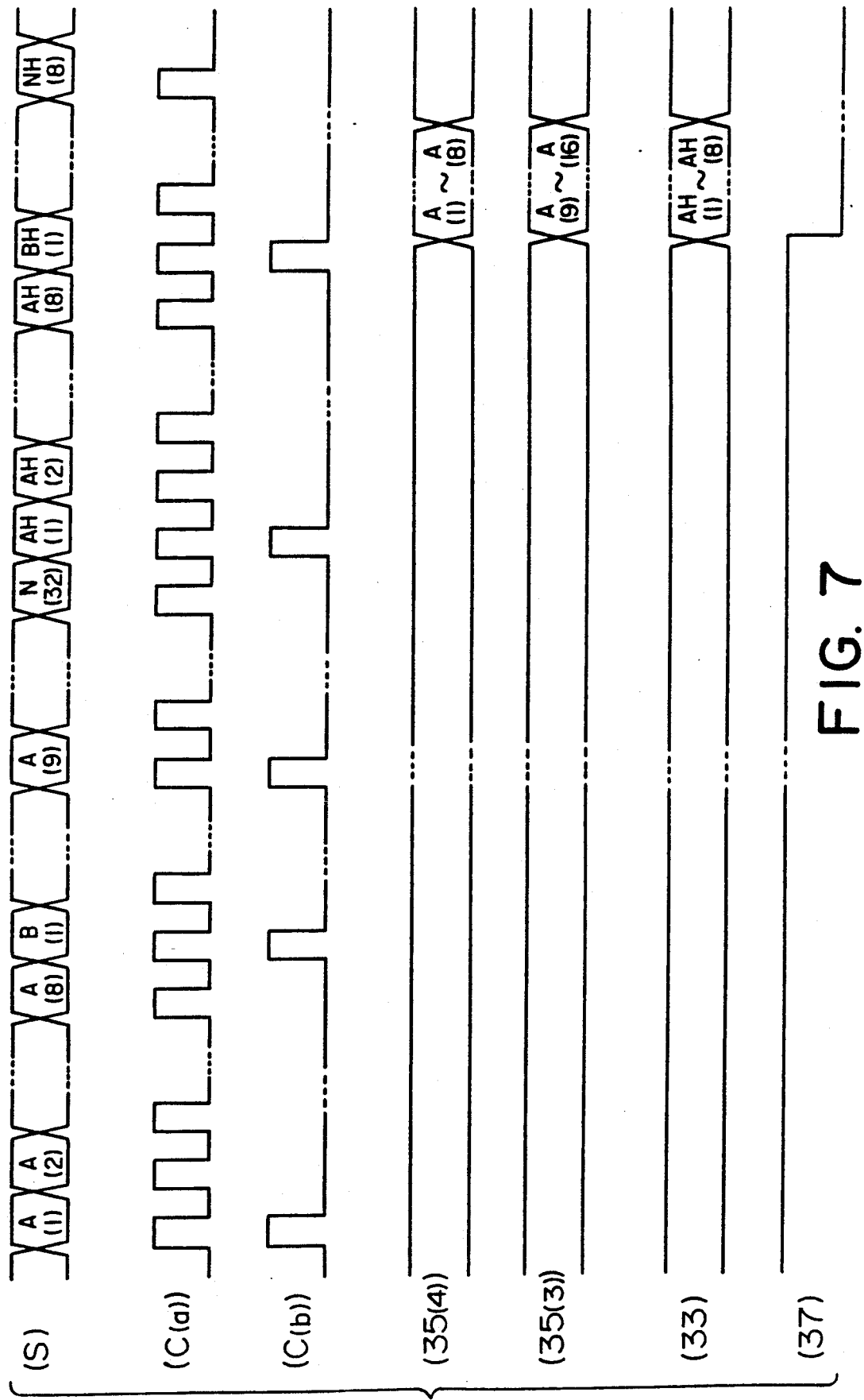
FIG. 7 is a time chart for use in describing operation of the device illustrated in FIG. 6.

Referring now to FIG. 6 and 7, the description will proceed to a header error check device according to a first embodiment of this invention. In FIG. 6, similar parts are designated by like reference symbols. Like in FIGS. 1 and 4, the data input terminal 12 is supplied with an original STM signal S. The illustrated header error check device has a single data output terminal 31.

Supplied with the path overhead and the section overhead which are indicated by the original STM signal S received from the data input terminal 12, the SDH terminator or terminating circuit 15 produces a bit control signal C(a) and a unit control signal C(b).

In the manner illustrated in FIG. 7 along a first or top row labelled (S), the original ATM signal is not different from that described in conjunction with FIGS. 1 through 5. As depicted along a second row labelled (C(a)), the bit control signal indicates the bits of the first through the N-th ATM cell header units of the first through the P-th header blocks and the bits of the first through the N-th ATM cell header error check units. In the manner exemplified along a third row labelled (C(b)) by pulses, the unit control signal indicates successively the first through the N-th ATM cell header units in the first through the P-th header blocks and subsequently successively the first through the N-th ATM cell header error check units.

A serial-parallel (S/P) converter 33 is supplied with the original ATM signal S from the data input terminal 12 and controlled by the bit and the unit control signals C(a) and C(b) supplied from the SDH terminator 15. Controlled by the bit control signal C(a) when the unit control signal C(b) indicates the (p, n)-th ATM cell header unit, namely, the n-th ATM cell header unit in the p-th header block, the serial-parallel converter 33 produces a zeroth bit-parallel signal which represents in bit parallel the (p, n)-th ATM cell header unit and subsequently the n-th ATM cell header error check unit when the unit control signal C(b) indicates the n-th ATM cell header error check unit.

First through P-th delay circuits 35(1), 35(2), . . . , and 35(P) are connected in cascade to the serial-parallel converter 33. The first through the P-th delay circuits 35 (suffixes omitted) are for producing first through N-th bit-parallel signals with each delay circuit supplied with the unit control signal C(b) from the SDH terminator 15. In this manner, a p-th delay circuit 35(p) produces a p-th bit-parallel signal by giving a (p-1)-th bit-parallel signal a delay which is equal to NQ bit intervals, namely, to N times a plurality of bit intervals, equal in number to the third predetermined natural number Q. When p is equal to unity, the (p-1)-th bit-parallel signal is the zeroth bit-parallel signal.

When the unit control signal C(b) eventually indicates the n-th ATM cell header error check unit, the first through the P-th bit-parallel signals represent the n-th ATM cell header units of the first through the P-th header blocks in bit parallel. At this moment of time, the zeroth bit-parallel signal represents the n-th ATM cell header error check unit in bit parallel.

In FIGS. 6 and 7, it is presumed that the first predetermined natural number P is equal to four. The delay circuits 35 are consequently designated by the reference numerals 35(1), 35(2), 35(3), and 35(4). In the manner exemplified in FIG. 7 along fourth through sixth rows labelled (35(4)), (35(3)), and (33), the fourth bit-parallel signal represents the bits A(1) through A(8) of the first ATM cell header unit of the first header block at a time instant after the unit control signal C(b) indicates the first ATM cell header error check unit. The third bit-parallel signal represents the bits A(9) through A(16) of the first ATM cell header unit of the second header block at the time instant under consideration. In a like manner, the second and the first bit-parallel signals represent the bits A(17) through A(32) of the first ATM cell header units of the third and the fourth header blocks. The zeroth bit-parallel signal represents the bits AH(1) through AH(8) of the first ATM cell header error check unit at the time instant in question. It is now understood in general that the p-th bit-parallel signal represents the bits of the n-th ATM cell header unit in a (P-(p−1))-th header block when the unit control signal indicates the n-th ATM cell header error check unit.

In FIG. 6, a single cyclic redundancy (CRC) circuit 37 is supplied with the zeroth through the P-th bit-parallel signals from the serial-parallel converter 33 and from the first through the P-th delay circuits 35. Carrying out the cyclic redundancy check on the zeroth through the P-th bit-parallel signals related to the n-th ATM cell header units of the first through the P-th header blocks and to the n-th ATM cell header error check unit, the cyclic redundancy check circuit 37 produces an n-th check result signal representative of an n-th check result among first through N-th check results which are successively represented by first through N-th check result signals when the unit control signal C(b) indicates the first through the N-th ATM cell header error check units in succession.

In the manner exemplified in FIG. 7 along a seventh or bottom row labelled (37), the first check result signal has high and low levels like that described in conjunction with FIGS. 1 and 2. When no header error is found in the n-th ATM cell header units of the first through the P-th header blocks, the n-th check result signal is given the low level without loss of generality.

More particularly, the cyclic redundancy check circuit 37 divides a combination of the n-th ATM cell header units of the first through the P-th header blocks and the n-th ATM cell header error check unit by the generation polynomial and produces the n-th check result signal which has the low and the high levels when a residue is and is not equal to zero, respectively. In other words, the cyclic redundancy check circuit 37 produces the n-th check result signal which has the low and the high levels when the residue is absent and present, respectively.

Figure 8:
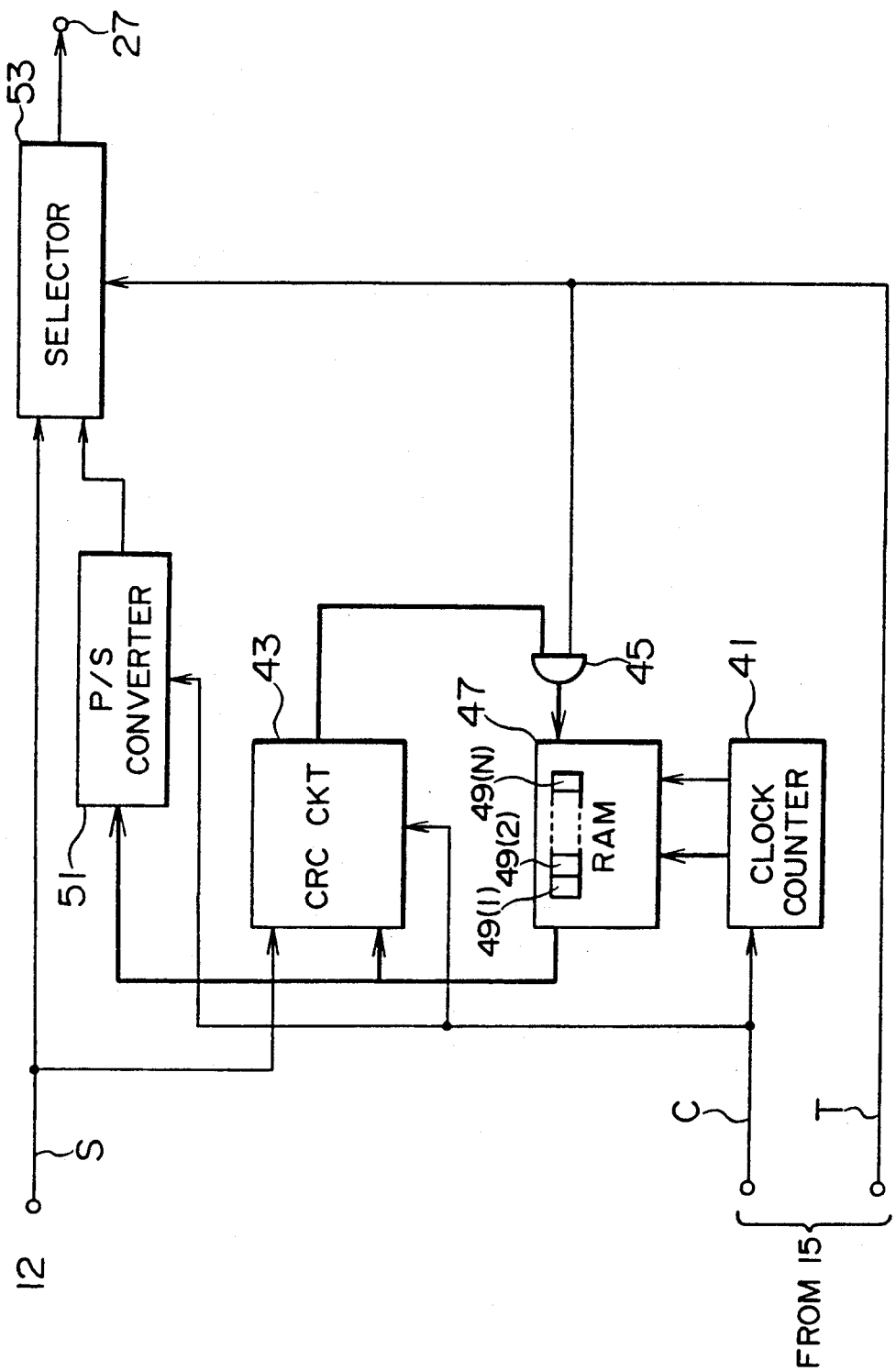
FIG. 8 is a block diagram of a header error check device according to a second embodiment of this invention.
Figure 9:
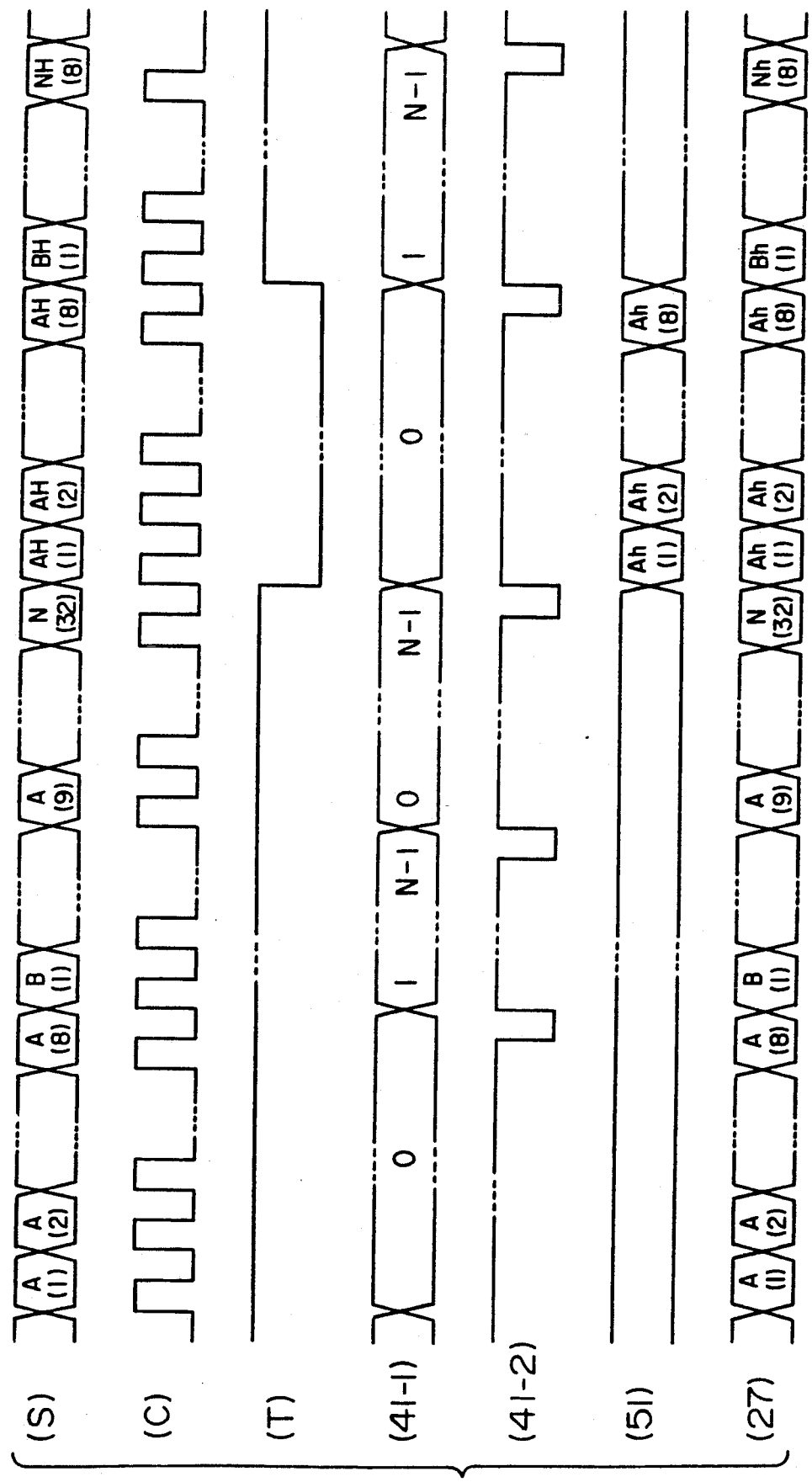
FIG. 9 is a time chart for use in describing operation of the device illustrated in FIG. 8.

Referring to FIGS. 8 and 9, attention will be directed to a header error check device according to a second embodiment of this invention. In FIG. 8, similar parts are designated again by like reference numerals. The data input terminal 12 is for receiving the original STM signal S. The header error check device is for supplying the data output terminal 27 with a rebuilt STM signal of the type described in connection with FIGS. 4 and 5 as the data output signal.

In FIG. 8, the SDH terminator 15 (FIGS. 1 and 6) is supplied with the original STM signal S from the data input terminal 12. Controlled by the section overhead and the path overhead, the SDH terminator 15 produces a bit control signal C and a unit selection signal T. The bit control signal is not different from the described in conjunction with FIGS. 6 and 7. The unit selection signal will presently be described.

In the manner illustrated in FIG. 9 along a first or top row labelled (S), the STM signal is not different from that hitherto described. In the manner depicted along a second row labelled (C), the bit control signal indicates the bits of the first through the N-th ATM cell header units of the first through the P-th header blocks and the bits of the first through the N-th ATM cell header error check units. As exemplified along a third row labelled (T) in connection with the first ATM cell header error check unit alone, the unit selection signal selectively indicates the first through the N-th ATM cell header error check units by a logic zero level.

In the header error check device being illustrated, a clock counter 41 is supplied with the bit control signal C from the SDH terminator 15. Counting the bits which are indicated by the bit control signal C, the clock counter 41 counts up a clock count one by one from an initial value of zero whenever the bits are counted to the third predetermined natural number Q. The clock count is reset to the initial value as soon as the clock count of (N−1) is reached. The clock counter 41 thereby produces a count signal representing such clock counts as (0, 1)-th through (0, N)-th, (1, 1)-th through (1, N)-th, . . ., (p, 1)-th through (p, N)-th, . . ., and (P, 1)-th through (P, N)-th clock counts. Each of (p, n)-th clock counts is represented in bit parallel by the count signal which is an equivalent of the unit control signal C(b) described in connection with FIGS. 6 and 7.

The clock counter 41 additionally produces a write pulse sequence of negative-going write pulses indicative of write-in in the manner which will shortly be described. In the write pulse sequence, the write pulses appear to indicate (0, 1)-th through (0, N)-th, . . . , (p, 1)-th through (p, N)-th, . . . , and (p, 1)-th through (P, N)-th write-in instants which are numbered in correspondence to the clock counts. Each write pulse is produced when the count signal ceases to indicate a correspondingly numbered clock count.

In the manner illustrated in FIG. 9 along a fourth row labelled (41-1), the count signal represents zero through (N−1) repeatedly as the (p, 1)-th through the (p, N)-th clock counts with the number p indicative of successive header blocks incremented one by one at each repetition. The write pulse sequence is depicted without the numbers of the write-in instants along a fifth row labelled (41-2).

In FIG. 8, a single cyclic redundancy check (CRC) circuit 43 is supplied with the original STM signal S directly from the data input terminal 12 and with the bit control signal C from the SDH terminator 15. In the manner which will presently be described, the cyclic redundancy check circuit 43 is supplied furthermore with a (p, n)-th previous result signal which represents at a current time instant defined by the (p, n)-th write-in instant a previous result obtained at a previous time instant defined by a (p−1, n)-th write-in instant, namely, at N times the third predetermined natural number Q of bit intervals prior to the (p, n)-th write-in instant.

Using the previous result signal, the cyclic redundancy check signal 43 selects the (p, n)-th ATM cell header unit from the original STM signals and carries out the cyclic redundancy check on the (p, n)-th ATM cell header unit to produce the (p, n)-th result signal of the type described in connection with FIGS. 4 and 5. More particularly, the (p, n)-th result signal serves as a (p, n)-th intermediate result signal representative of a (p, n)-th updated ATM cell header error check unit as the (p, n)-th result in bit parallel.

An AND gate 45 is supplied with the (p, n)-th intermediate result signal from the cyclic redundancy check circuit 43. Supplied additionally with the unit selection signal T from the SDH terminator 15, the AND gate 45 allow the (p, n)-th intermediate result signal to pass therethrough as a (p, n)-th output result signal insofar as the unit selection signal T is given a high level depicted in FIG. 9 along the third row (T).

A random access memory (RAM) 47 is supplied with the (p, n)-th output result signal from the AND gate 45 and has first through N-th memory cells which are symbolically depicted at 49(1), 49(2), ..., and 49(N) and are accessible by the (p, 1)-th through the (p, N)-th clock counts represented by the count signal supplied from the clock counter 41. In response to the count signal and the write pulse sequence supplied from the clock counter 41 to indicate the (p, n)-th clock count for accessing to an n-th memory cell 49(n) and to indicate the correspondingly numbered write-in instant, the (p, n)-th output result signal is stored in the n-th memory cell 49(n) as a (p, n)-th memorized result signal. While supplied only with the count signal representative of the (p, n)-th clock count, the random access memory 47 produces a (p−1, n)-th memorized result signal from the n-th memory cell 49(n) as the (p, n)-th previous result signal.

In the meantime, the count signal represents the (P, n−1)-th clock count and immediately subsequently the (P, n)-th clock count. At this instant of time, the (P, n)-th output result signal is stored in the n-th memory cell 49(n) as an n-th final result signal. When the count signal represents a (P, n)-th clock count, the random access memory 47 produces the (P, n)-th final result signal as the n-th result signal representative of the n-th result of the type described in connection with FIGS. 4 and 5.

It is now understood in connection with FIGS. 8 and 9 that a combination of the AND gate 45 and the random access memory 47 serves as a memory section connected to the cyclic redundancy check circuit 43 and controlled by the write pulse sequence which serves as the unit control signal. When the unit control signal indicates successively the (p, n)-th ATM cell header units, the memory section (45, 47) memorizes the (p, n)-th intermediate result signals as the (p, n)-th memorized result signals and supplies the cyclic redundancy check circuit 43 with the (p−1, n)-th memorized result signals as the (p, n)-th previous result signals to produce, when the unit control signal eventually indicates the n-th ATM cell header error check unit, the (P, n)-th memorized result signal as an n-th result representative of the error correcting code (namely, the residue) in connection with the (p, n)-th ATM cell header units.

Briefly stated with reference to FIGS. 8 and 9, the cyclic redundancy check circuit 43 is connected to the data input terminal 12 and to the SDH terminator 15 and is for carrying out the cyclic redundancy check, when the unit control signal indicates successively the n-th ATM cell header units in the first through the P-th header blocks, on the (p, n)-th ATM cell header units and the (p, n)-th previous result signals. The cyclic redundancy check circuit 43 thereby produces results of the cyclic redundancy check as the (p, n)-th intermediate result signals with each (p, n)-th intermediate result signal produced in bit parallel in accordance with the bit control signal C.

Another combination of the SDH terminator 15 and the clock counter 41 serves as a control signal producing section. Connected to the data input terminal 12, the control signal producing section (15, 41) produces the bit control signal C and the unit control signal collectively as the afore-described collective control signal.

Reviewing FIGS. 6 and 7 and the description so far made with reference to FIGS. 8 and 9, the header error check device has the data input terminal 12 for receiving the STM signal S and includes either the SDH terminator 15 or the combination of the SDH terminator 15 and the clock counter 41 as a control signal producing section for producing the collective control signal. Either a combination of the serial-parallel converter 33, the delay circuits 35, and the cyclic redundancy check circuit 37 or another combination of the single cyclic redundancy check circuit 43 and the memory section (45, 47) serves as a sole error checking section. Connected to the data input terminal 12 and to the control signal producing section (15 or 15, 41), the sole error checking section (33, 35, 37 or 43, 45, 47) checks the header error in connection with the n-th ATM cell header unit of the p-th header block and the n-th ATM cell header error check unit when the collective control signal indicates the n-th ATM cell header unit of the p-th header block and subsequently the n-th ATM cell header error check unit.

Referring more particularly to FIGS. 8 and 9, the header error check device comprises a parallel-serial (P/S) converter 51 supplied with the bit control signal C from the SDH terminator 15 and with the n-th final result signal from the random access memory 47 when the count signal represents the (P, n)-th ATM cell header unit. Controlled by the bit control signal, the parallel-serial converter 51 converts the n-th final result signal to an n-th updated ATM cell header error check unit of first through N-th updated ATM cell header error check units. In the manner exemplified in FIG. 9 along a sixth row labelled (51), the first updated ATM cell header error check unit consists of first through N-th or eighth updated bits Ah(1), Ah(2), ..., and Ah(8).

A single selector or switch 53 is connected to the data input terminal 12, the SDH terminator 15, the data output terminal 27, and the parallel-serial converter 51. When controlled by the unit selection signal T indicative of the n-th ATM cell header error check unit, the selector 53 substitutes the n-th updated ATM cell header error check unit for the n-th original ATM cell header error check unit. The selector 53 eventually supplies the data output terminal 27 with a rebuilt STM signal in which the first through the N-th original ATM cell header error check units are selectively changed to the first through the N-th updated ATM cell header error check units. In FIG. 9, the rebuilt STM signal is depicted along a seventh or bottom row labelled (27).

The unit selection signal T has the low level on indicating the n-th ATM cell header error check unit. In this event, the AND gate 45 produces a zero signal instead of the (p, n)-th output result signal.

Figure 10:
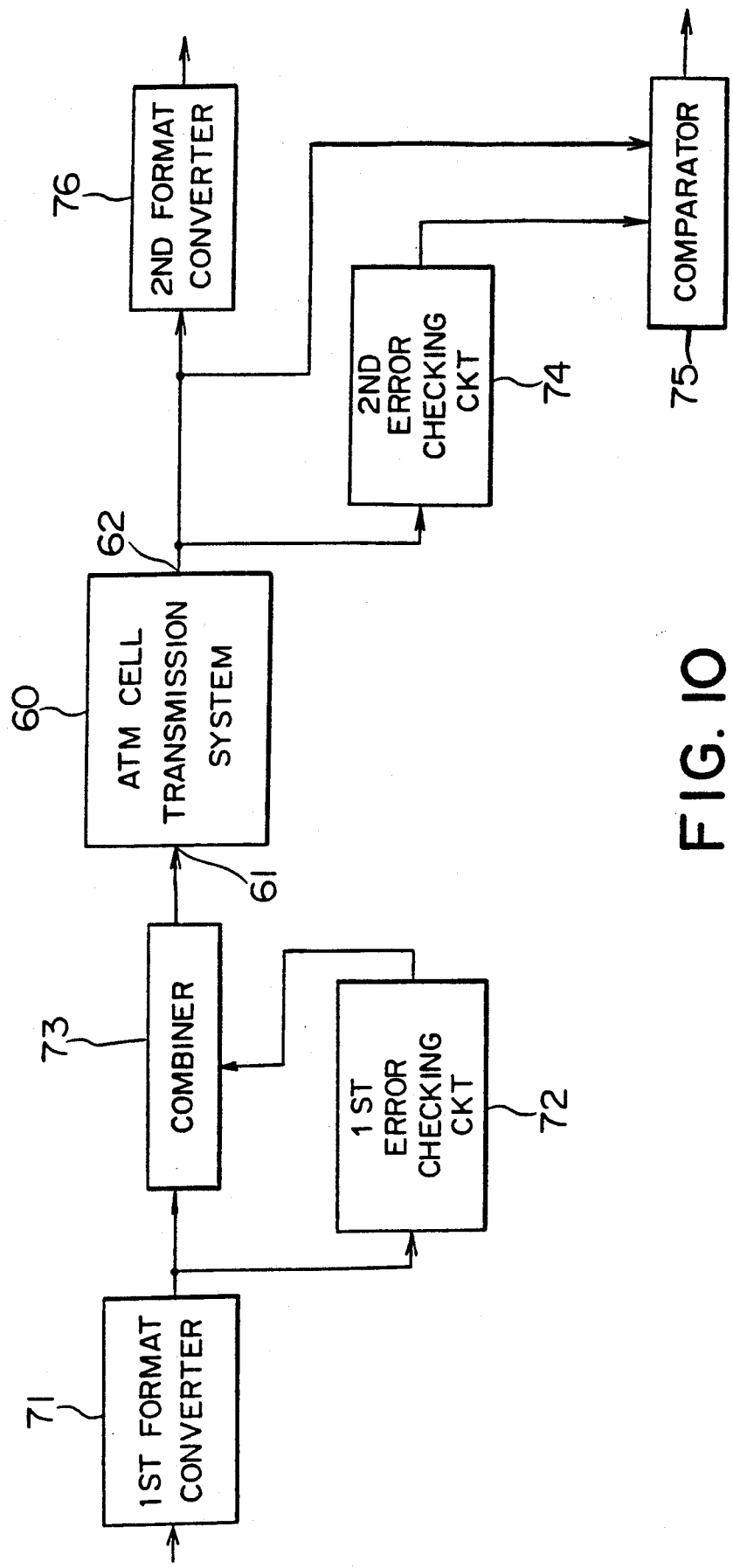
FIG. 10 is a block diagram of an ATM cell monitoring device according to a third embodiment of this invention.

Referring now to FIG. 10, an ATM cell monitoring device is an error check device according to a third embodiment of this invention and is for use in combination with an ATM cell transmission system 60 having system input and system output terminals 61 and 62. The system input terminal 61 is for receiving a system input ATM cell. The ATM cell transmission system 60 is for transmitting the system input ATM cell to the system output terminal 62 as it is. The ATM cell transmission system thereby produces the system input ATM cell as a system output ATM cell. The ATM cell transmission system 60 is, for example, a cross-connection network known in the art.

The ATM cell monitoring device is for monitoring the ATM cell transmission system 60 to check an error in the system output ATM cell. The ATM cell monitoring device comprises a first format converter 71 supplied with an original ATM cell of a preselected number of bytes which cell typically consists of fifty-three bytes in the manner described in conjunction with FIG. 3.

The original ATM cell is included in another virtual container VC-4(NC) carried by another STM signal. As is known in the art, the virtual container VC-4(NC) comprises a path overhead POH and a succession of ATM cells following the path overhead POH in the other STM signal. When attention is directed to one of the succession of ATM cells, this one of the succession of ATM cells is referred to as the original ATM cell. Controlled by another SDH terminator which is similar to the SDH terminator 15 illustrated in FIG. 1 and is not herein depicted, the original ATM cell is supplied to the first format converter 71.

The first format converter 71 converts the original ATM cell into a first converted ATM cell of the preselected number of bytes plus an empty byte which is illustrated in FIG. 3 as an area partly enclosed with a dash-dot line.

Connected to the first format converter 71, a first error checking circuit 72 checks a first error in the preselected number of bytes of the first converted ATM cell to produce a first error correcting code. The first error checking circuit is typically a first cyclic redundancy check (CRC) circuit. In this case, the first error correcting code is a first residue given by dividing by a generation polynomial the preselected number of bytes of the original ATM cell included in the first converted ATM cell.

A combiner 73 is connected to the system input terminal 61 of the ATM cell transmission system 60, the first format converter 71, and the first error checking circuit 72. The combiner 73 produces a full ATM cell by placing the first error correcting code in the empty byte of the first converted ATM cell. The combiner 73 delivers the full ATM cell to the system input terminal 61 as the system input ATM cell.

A second error checking circuit 74 is connected to the system output terminal 62 of the ATM cell transmission system 60. The second error checking circuit 74 checks a second error in the preselected number of bytes of the original ATM cell included in the system output ATM cell to produce a second error correcting code. The second error checking circuit is typically a second cyclic redundancy check (CRC) circuit. In this case, the second error correcting code is a second residue given by dividing the preselected number of bytes in the system output ATM cell by the generation polynomial.

Connected to the system output terminal 62 of the ATM cell transmission system 60 and the second error checking circuit 74, a comparator 75 carries out a comparing operation of comparing the first error correcting code in the system output ATM cell with the second error correcting code to produce a result of the comparing operation. More specifically, the comparator 75 produces, as the result of the comparing operation, coincidence and non-coincidence signals representing coincidence and non-coincidence between the first error correcting code and the second error correcting codes.

Connected to the system output terminal 62 of the ATM cell transmission system 60, a second format converter 76 converts the system output ATM cell of the preselected number of bytes plus the first error correcting code into a second converted ATM cell consisting of the preselected number of bytes. When the coincidence signal is produced by the comparator 75, the original ATM cell is correctly transmitted as the second converted ATM cell by the ATM cell transmission system 60. When the non-coincident signal is produced by the comparator 75, the original ATM cell is incorrectly transmitted as the second converted ATM cell by the ATM cell transmission system 60.

Thus, the ATM cell monitoring device can check an error in the header and in the information field following the header in the ATM cell.

What is claimed is:

1. A header error check device which has a data input terminal for receiving an STM signal comprising a header part, said header error check device being for checking a header error in said header part, said header part comprising first through P-th header blocks and a header error check block, where P represents a first predetermined natural number, each of said header blocks comprising first through N-th ATM cell header units, where N represents a second predetermined natural number, said header error check block comprising first through N-th ATM cell header error check units, said header error check device including a control signal producing section connected to said data input terminal for producing a collective control signal for indicating successively the first through the N-th ATM cell header units of said first through said P-th header blocks and subsequently successively said first through said N-th ATM cell header error check units, said header error check device comprising:

a sole error checking section connected to said data input terminal and to said control signal producing section for checking said header error in connection with an n-th ATM cell header unit of a p-th header block and an n-th ATM cell header error check unit when said collective control signal indicates said n-th ATM cell header unit of the p-th header block and said n-th ATM cell header error check unit, where n is variable between 1 and N, both inclusive, p being variable between 1 and P, both inclusive.

2. A header error check device as claimed in claim 1, each of said first through said N-th ATM cell header units and said first through said N-th ATM cell header error check units comprising a third predetermined natural number of bits at a predetermined bit interval, said control signal producing section being for producing a bit control signal and a unit control signal collectively as said collective control signal, said bit control signal being indicative of the bits of the first through the N-th ATM cell header units of said first through said P-th header blocks and the bits of said first through said N-th ATM cell header error check units, said unit control signal being indicative of the first through the N-th ATM cell header units of said first through said P-th header blocks and said first through said N-th ATM cell header error check units, wherein said sole error checking section comprises:

a serial-parallel converter connected to said data input terminal and controlled by said bit control signal and said unit control signal for converting each of the first through the N-th ATM cell header units of said first through said P-th header blocks and each of said first through said N-th ATM cell header error check units to a zeroth bit-parallel signal;

first through p-th delay circuits connected in cascade to said serial-parallel converter and controlled by said unit control signal for producing first through p-th bit-parallel signals by giving a delay of a plurality of bit intervals, equal in number to N times said third predetermined natural number, to a (p−1)-th bit-parallel signal; and an error checking circuit connected to said serial-parallel converter and to said first through said P-th delay circuits for checking said header error in response to said zeroth through said P-th bit-parallel signals, a p-th bit-parallel signal comprising the bits of said n-th ATM cell header units of the (P−(p−1))-th header block at a time instant, said zeroth bit-parallel signal comprising the bits of said n-th ATM cell header error check unit at said time instant.

3. A header error check device as claimed in claim 2, wherein said time instant is a time instant at which said unit control signal indicates the N-th ATM cell header unit of each of said first through said P-th header blocks.

4. A header error check device as claimed in claim 2, wherein said error checking circuit is a cyclic redundancy check circuit connected to said serial-parallel converter and to said first through said P-th delay circuits for carrying out cyclic redundancy check on said zeroth through said P-th bit-parallel signals to check said header error.

5. A header error check device as claimed in claim 1, each of said ATM cell header units and said ATM cell header error check units comprising a third predetermined natural number of bits at a predetermined bit interval, said control signal producing section being for producing a bit control signal and a unit control signal collectively as said collective control signal, said bit control signal being indicative of the bits of the first through the N-th ATM cell header units of said first through said P-th header blocks and the bits of said first through said N-th ATM cell header error check units, said unit control signal being indicative of the first through the N-th ATM cell header units in said first through said P-th header blocks and of said first through said N-th ATM cell header error check units, wherein said sole error checking section comprises:

a single cyclic redundancy check circuit connected to said data input terminal and to said control signal producing section for carrying out cyclic redundancy check, when said unit control signal indicates successively the n-th ATM cell header units of said first through said P-th header blocks as (p, n)-th ATM cell header units, on said (p, n)-th ATM cell header units and (p, n)-th previous result signals, said cyclic redundancy check circuit being for producing results of said cyclic redundancy check as (p, n)-th intermediate result signals with each of said (p, n)-th intermediate result signals produced in bit parallel in accordance with said bit control signal; and a memory section connected to said cyclic redundancy check circuit and controlled by said unit control signal for memorizing, when said unit control signal indicates successively said (p, n)-th ATM cell header units, said (p, n)-th intermediate result signals as (p, n)-th memorized result signals and for supplying said cyclic redundancy check circuit with (p−1, n)-th memorized result signals as said (p, n)-th previous result signals, said memory section being for producing a (P, n)-th memorized result signal as an n-th result when said unit control signal indicates said n-th ATM cell header error check unit.

6. A header error check device as claimed in claim 5, said control signal producing section being for additionally producing a unit selection signal selectively indicative of said first through said N-th ATM cell header error check units, wherein said header error check device further comprises a single selector section connected to said data input terminal, said control signal producing section, and said memory section for substituting said n-th result for said n-th ATM cell header error check unit when said unit selection signal indicates said n-th ATM cell error check unit, said single selector section being for changing said STM signal to a rebuilt STM signal in which said first through said N-th ATM cell header error check units are selectively changed to first through N-th results produced by said memory section.

7. An ATM cell monitoring device for use in combination with an ATM cell transmission system having system input and system output terminals, said system input terminal being for receiving a system input ATM cell, said ATM cell transmission system being for transmitting said system input ATM cell to said system output terminal as it is, said ATM cell transmission system being for producing said system input ATM cell as a system output ATM cell, said ATM cell monitoring device being for monitoring said ATM cell transmission system to check an error in said system output ATM cell, said ATM cell monitoring device comprising:

a first format converter supplied with an original ATM cell of a preselected number of bytes for converting said original ATM cell into a first converted ATM cell of said preselected number of bytes plus an empty byte;

a first error checking circuit connected to said format converter for checking a first error in the preselected number of bytes in said first converted ATM cell to produce a first error correcting code;

a combiner connected to said system input terminal of the ATM cell transmission system, said format converter, and said first error checking circuit for producing a full ATM cell by placing said first error correcting code in the empty byte of said first converted ATM cell, said combiner delivering said full ATM cell to said system input terminal as said system input ATM cell;

a second error checking circuit connected to said system output terminal of the ATM cell transmission system for checking a second error in the preselected number of bytes in said system output ATM cell to produce a second error correcting code; and a comparator connected to said system output terminal of the ATM cell transmission system and said second error checking circuit for carrying out a comparing operation of comparing said first error correcting code in said system output ATM cell with said second error correcting code to produce a result of said comparing operation.

8. An ATM cell monitoring device as claimed in claim 7, wherein said ATM cell monitoring device further comprises a second format converter connected to said system output terminal of the ATM cell transmission system for converting said system output ATM cell of said preselected number of bytes plus said first error correcting code into a second converted ATM cell of said preselected number of bytes.

9. An ATM cell monitoring device as claimed in claim 7, wherein:

said first error checking circuit is a first cyclic redundancy check circuit connected to said first format converter for checking said first error in the preselected number of bytes in said first converted ATM cell to produce said first error correcting code;

said second error checking circuit being a second cyclic redundancy check circuit connected to said system output terminal of the ATM cell transmission system for checking said second error in the preselected number of bytes in said system output ATM cell to produce said second error correcting code.

* * * * *